Figure 1:
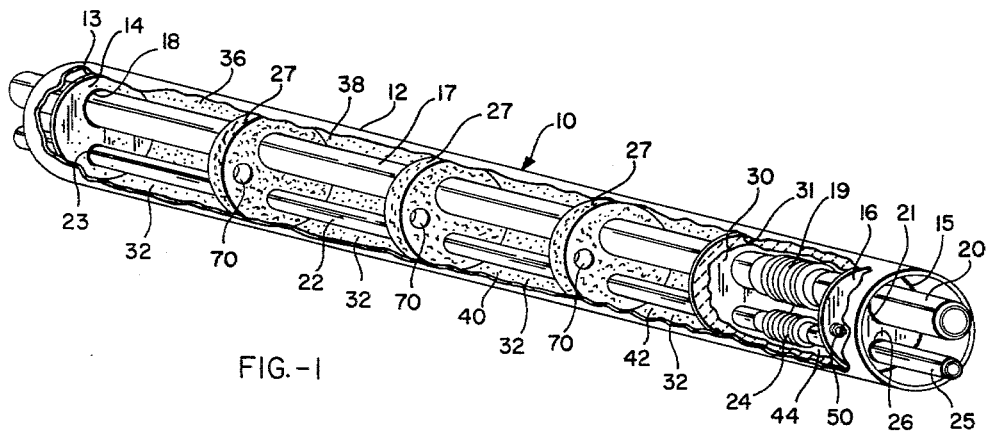

May 10, 1966  N. L. MOONEYHAM  3,250,297

CONDUIT SYSTEM

Filed Oct. 10, 1963

INVENTOR.
NOBLE L. MOONEYHAM
BY
*Watts & Fisher*
ATTORNEY

United States Patent Office 3,250,297
Patented May 10, 1966

3,250,297
CONDUIT SYSTEM
Noble L. Mooneyham, Niles, Mich., assignor to Durant Insulated Pipe Co., Inc., Niles, Mich., a corporation of Delaware
Filed Oct. 10, 1963, Ser. No. 315,308
14 Claims. (Cl. 138—113)

This invention pertains to insulated piping and more particularly to pre-fabricated insulating piping systems and a method of making them.

In the past, many insulated piping systems have been constructed and installed. These systems are usually equipped with devices known as "expansion loops" installed at spaced locations to absorb expansion and contraction occasioned by temperature variations. One such expansion loop is described and claimed in United States Patent No. 2,378,214, issued to C. Gottwald on June 12, 1945. Anchors such as those described in United States Patent No. Re. 22,988, issued to W. S. McLeish, under the title Anchor, are interspersed between the expansion loops to control and confine the expansion. While these previous devices have proved highly suitable in many instances, they do have certain inherent disadvantages, especially in relatively small sized systems.

These pre-fabricated systems usually include a fluid transmitting pipe surrounded by an outer protective casing. Pipe supports, such as those described in Cotman Patent No. 2,903,017, issued September 8, 1959, under the title pipe support, are used to maintain the pipe and the casing in spaced relationship. Insulation, such as tubes of Fiberglas, surround the pipe and are positioned within the casing.

When expansion loops, such as those disclosed in the above-referred to Gottwald patent, are used, it will be recognized that extra lengths of pipe casing and insulation are required as compared with a straight line pipe system. Thus, in many installations, the extra pipe required plus the extra excavation required to install the pipe in the ground leads to a highly expensive system. Moreover, especially where there is a relatively long run between a source of, for example, steam, and the place where the steam is to be used, heat losses may be excessive and are obviously considerably increased by the expansion loops because of the extra distances the steam must travel. Moreover, there is some loss in pressure and velocity heads occasioned by the sharp corners which the fluid flowing through the pipe must negotiate. These losses are worthy of consideration where the flow through the pipe is relatively high velocity.

Another problem with the prior systems has been that if a leak occurs in the casing the entire system becomes flooded. It is difficult to locate the leak and once located it becomes difficult to dry the entire system because insulation throughout the system will have become flooded with water losing its heat insulating properties.

In the past, attempts have been made to eliminate expansion loops and to overcome the problems discussed and others through the provision of expansible bellows. These proposals have resulted in failure because of premature bellows failure.

The present invention seeks to overcome the disadvantages of the prior proposals for using expansible bellows providing a dependable rugged system using such bellows. In addition, the present system is made up of sealed separate units so that any flooding occasioned by leakage is confined to a separate section of the pipe where it can be located, repaired, and relatively simple drying is possible. In addition, the present invention permits the use of less expensive, but nonetheless more efficient insulating mediums providing greater resistance to heat loss.

With the present system, a pipe including a bellows is positioned within a casing. Spacers are provided to maintain the pipe and the casing in appropriate aligned and spaced relationship. Alignment guides are provided adjacent the bellows to maintain the pipe in alignment and thereby obviate misalignment problems which have, in the past, occasioned many premature bellows failures. In addition, the bellows are pretensioned to minimize the total expansion and contraction which must be absorbed by the bellows, thereby further overcoming previous problems which have led to bellows failures and resulting in a system which has exceptionally long life and durability. End bulk heads are provided which are welded to the pipe and the surrounding casing to anchor the two together in fluid, tight relationship.

Accordingly, an object of this invention is to provide an improved insulated pipe system which eliminates expansion loops and anchors.

Another object of this invention is to provide a method for making an improved insulated pipe.

Yet another object of this invention is to provide an improved insulated pipe which is a unit item of construction and in which the unit is sealed and provision is made in the unit for thermal expansion and contraction of the conduit.

Still another object of this invention is to provide a method for making an insulated pipe unit which is completely sealed and contains provision for thermal expansion and contraction.

A further object of this invention is to provide an insulated pipe construction which utilizes low cost, highly efficient, granular insulation.

A still further object of this invention is to provide a pipe unit which can be manufactured as a sealed unit and may be leak tested before delivery to the installation site.

Figure 2:
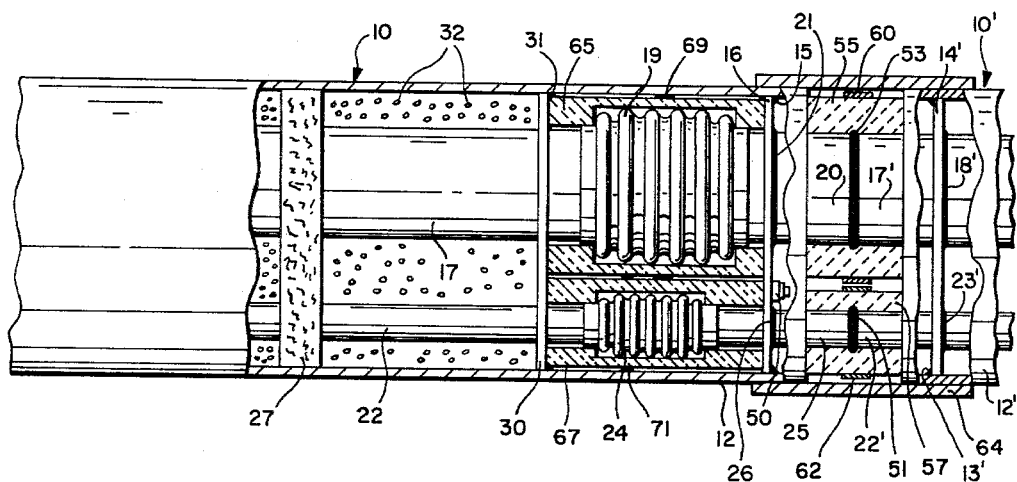

Other objects and a fuller understanding of the invention may be had by referring to the following description and claims taken in conjunction with the accompanying drawing in which:

FIGURE 1 is a view, in perspective, of one illustrative embodiment of this invention; and, FIGURE 2 is a view, in elevation, partly in section, of a portion of the embodiment of FIGURE 1, shown to a larger scale, and a portion of a second unit which is joined to the first unit.

Referring now to FIGURE 1, a perspective view of one embodiment of an insulated pipe unit 10 is shown. The insulated pipe unit 10 has a casing 12 which will usually be covered with a suitable protective coating. The unit 10 has, near its ends, a pair of apertured bulkheads 14, 16. The bulkheads are welded within the casing 12 near opposite ends thereof by means of welds 13 and 15, respectively. The bulkheads 14, 16 act as built-in expansion anchors for conductor pipes 17, 20, 22, 25 and also act as moisture seals for the insulated pipe unit. This particular pipe unit includes a first conductor pipe 17 having one end projecting through and secured to the bulkhead 14 by means of a weld 18. The other end of conduit 17 is coupled to one end of an expansion means in the form of fellows 19. The other end of bellows 19 is connected to conductor pipe 20 which projects through and is welded to the bulkhead 16 by weld 21. When connected in a system, fluid flows through the pipe 17, the bellows 19, and the pipe 20, or vice versa.

The unit 10 includes a second conductor pipe 22 having one end projecting through and secured to the bulkhead 14 by means of weld 23 and the other end connected to an expansion bellows 24. The other end of the bellows 24 is connected to a conductor pipe 25 which projects through and is welded to the bulkhead 16 by means of a weld 26. Pipes 17, 20, 22, and 25 project beyond the casing 12 to facilitate connection to other units of an insulated pipe system in a manner which will be subsequently described. When a heated fluid, such as steam, flows through pipe 17, the pipe expands from the weld 18 in the direction of and compressing the bellows 19. Similarly, if pipe 22 is used to conduct a cooled fluid, it will contract away from the bellows 24, causing the bellows 24 to elongate. Because the lengths of pipes 17, 22 between the bulkhead 14 and the bellows 19, 24, respectively, are very long in comparison to the short lengths which project beyond the baffles, substantially all expansion and contraction takes place within the unit and is absorbed by the bellows 19, 24. Intermediate the bulkheads is a plurality of spaced pipe supports 27 which supports are translatable, in other words, they are not secured to the casing 12 nor are they secured to conductor pipes 17, 21.

The unit includes an apertured steel plate known as an alignment guide 30 adjacent the bellows sections 19, 24 and welded at 31 to the casing 12. The alignment guide slidably supports the ends of pipes 17, 22 adjacent the bellows sections 19, 24. Alternately the alignment guide 30 may be welded to one of the two pipes such as the pipe 17 in the embodiment shown. The alignment guide 30 is then in slidable engagement with the pipe 22 and the casing. In a unit having a single pipe the alignment guide will be welded to it. With this arrangement, the pipes 17 and 22 are supported throughout their length and their position relative to the casing 12 is maintained.

The alignment guide 30 and the anchor 16 coact to provide one of the outstanding advantages of the invention. The guide 30 and the bulkhead maintain the pipes and bellows in alignment to within one-half of one degree thereby obviating failures occasioned by mal-alignment.

The spaces between the thrust arresting bulkheads 14, 16 and the pipe guide supports 27 and the alignment guide 30 are designated 36, 38, 40, 42, and 44. The spaces other than 44 are substantially filled with suitable granular insulation 32, only a small portion of which is shown. Because of the particular construction of the insulated pipe unit, a less expensive insulation and less of this insulation is required than in prior art types of pipe systems.

The preferred granular insulation is that sold commercially as Perlite. Perlite is manufactured by:

Johns-Manville Perlite Corp., 504 T Railroad, Joliet, Illinois
Great Lakes Carbon Corp., Perlite Department, Dept. 6128, Los Angeles, California
International Minerals and Chemical Corp., Old Orchard Road, Skokie, Illinois
Carolina Perlite Co., Inc., Salisbury, North Carolina
Tennessee Products Chemical Corp., 512 First American National Bank Bldg., Nashville, Tennessee This Perlite insulation is basically a type of volcanic glass rock containing trapped water when in a crude stage. The manufacturers of Perlite insulation take crushed crude Perlite and heat it to about 1500° F. The crude Perlite particles then expand and turn white. The trapped water vaporizes and microscopic cells or voids are formed in the heat-softened glass. The result is a honeycomb structure which is very light in weight and has excellent thermal insulation qualities. The cells are sealed and because of their sealed nature, expanded Perlite has greater strength and takes on less water than open-celled aggregates of the same weight. The chemical breakdown and analysis of crude Perlite is as follows:

| | Percent |
|---|---|
| Silicon dioxide | 73 |
| Aluminum oxide | 14 |
| Ferrous oxide | 1 |
| Calcium oxide | 1 |
| Potassium oxide | 1 |
| Sodium oxide | 3 |

The balance is usually composed of trace minerals and water, totaling about 7%. The density of the finished Perlite varies from 2 to 15 pounds per cubic foot.

Thermal insulation qualities are characterized by an extremely low so-called "K factor" of from 0.10 to 0.35 when measured at atmospheric pressure. A K-factor is a measure of thermal conductivity which may be defined as the quantity of heat (B.t.u) that flows in a unit of time (one hour) through a unit area (one square foot) of unit thickness (one foot), having a unit difference of temperature (1° F. between its faces).

In general form, the Perlite is a loose incombustible powder with a specific gravity of 0.048, approximately. The K-factor of Perlite is 0.31 to about 150° F. The temperature limitations of Perlite are from a minus 400° F. minimum to a maximum of 1400° F. It will be seen that this is, then, an ideal insulation. In prior prefabricated piping systems, Perlite was not usable because prior systems were open. With the present sealed unit, however, it will be seen that for the first time it is possible to use this outstanding insulation producing an over all construction of improved heat insulating characteristics.

The embodiment of FIGURE 1 includes a test plug 50 which is threaded, or otherwise joined, to the bulkhead 16 to permit the moisture sealing ability of the pipe unit to be tested by gas under pressure. The procedure for testing these pipe sections comprises introducing gas under pressure to the interior of the unit and connecting a gauge to the test plug to determine if pressure is lost from the interior of the unit. If such test is negative; i.e., if there is no pressure lost, then the unit is suitable for installation.

In FIGURE 2, the unit 10 is shown on an enlarged scale the unit of FIGURE 1 and an identical unit 10', neither of which is shown in its entirety, joined in a manner termed a "field joint." The portions of the right-hand unit 10' will be given prime numbers corresponding to the numbers of the lefthand unit 10. Thus the pipe 20 is joined to the pipe 17' by a suitable weld 53. Similarly, the pipe 25 is joined to the pipe 22' by a suitable weld 51. The welded junctions 20, 17' and 25, 22' are enclosed in suitable sections of insulation 55' and 57. These sections are formed by wrapping the pipe or as preformed semi-cylindrical elements placed on opposite sides of the respective pipes. The insulating sections 55, 57 are held in place by suitable metal bands such as bands 60 and 62.

After the insulation is secured in place, a sleeve 64, which was previously slid over the member 10' before it was brought into abutting relationship with the unit 10 and sleeve 64, is now slid into position to engage casings 12, 12'. Sleeve 64 has a longitudinal slit, not shown, and, when positioned as shown, it is drawn tightly about casings 12, 12' and welded to the casings and to itself.

Protective coatings may now be applied to the joints. It is to be understood that in the preferred construction each unit is identical to the unit shown in FIGURE 1 in which the unit is complete and self-contained and in which the expansion takes place within the unit and is absorbed by the respective bellows, 19, 24. With this form of construction, fluids heated or cooled over wide ranges of temperatures may be conducted with minimum heat transfer and a minimum of maintenance. For example, the pipes may be employed as a heating system in which pressures as high as 300 pounds per square inch gauge pressure may be employed or they may be used in a cryogenic system in which fluids as cold as minus 350° F. may be conducted through the conduits. Alternatively, a hot fluid may be transmitted through one pipe and a relatively cooler fluid transmitted through the other pipe.

In making this embodiment, pipes 17, 22 are supported on a suitable mandrel or the like. The alignment guide 30 and the supports 27 are placed over pipes 17, 22. The bellows 19, 24 are secured to pipes 17, 22, respectively and the pipes 20, 25 are attached to bellows 19, 24, respectively. Pre-formed insulation sections 65, 67 are now installed to insulate the expansion bellows from the casing.

The sections 65, 67 are employed to enclose bellows 19, 24, respectively, and extend axially from the alignment guide to the bulkhead 16. These sections of insulation may be formed in semi-cylindrical or cylindrical shape of calcium silicate or other similar forms of insulation. If semi-cylindrical, they are strapped into position by straps 69, 71, respectively.

The casing 12 is now slid over the supports 27 and the guide 30. The spaces 36, 38, 40, 42 are now filled with expanded Perlite. This may be done either as the casing is slid in place but is preferably done by blowing it in the end opposite the bellows or by pouring it in the end opposite the bellows while the unit is held upright and vibrated. The guide supports 27 may be apertured at 70 to accommodate this filling. The alignment guide, because of its relatively close fit with the pipes 17, 22 and welding to the casing 12 inhibits the passage of the Perlite into the bellows space between the guide 30 and the bulkhead 16. Once the unit is filled with Perlite, the bulkheads 14, 16 are positioned for welding.

One of the principal contributing factors to the successful use of bellows in this system is in pre-tensioning of the bellows. To effect this the pipes are tensioned until bellows 19, 24 are elongated a distance equal to approximately one-half of the expected expansion of the respective pipe and then, while the bellows are so elongated, the bulkheads 14, 16 are welded in place.

As an example of a pre-tensioning of one of the bellows, a typical installation will experience ground temperatures of approximately 50°. In use, steam at 300 lbs. per square inch pressure and about 450° will be conducted through the pipe. Thus, the pipe can vary in temperature from 50° F. to 450° F. or a total of 400°.

Expansion and contraction of pipe is substantially a lineal function of so many inches per unit of length per degree of temperature variation. Thus, the total length variation occasioned by temperature variation between 50° and 450° F. for a given length of pipe can be calculated. In a typical installation of six inch pipe, this will be about two inches. Thus, the bellows, either 19 or 24, would have to absorb a total of about two inches in variation in axial length of the pipe. Accordingly, and assuming the manufacturing operation is being performed at approximately the minimum temperature to which the finished unit will be subjected, the bellows will be tensioned approximately one inch. Expressed another way, the pipe and connected bellows will be tensioned to the length the pipe would assume at 250° F. Welding of the bulkheads is then performed.

When the device is put in use, expansion occasioned as the temperature rises from 50 to 250° will gradually overcome the pre-tensioning until the bellows at about 250° is at a relaxed, unstressed condition. Thereafter, the bellows will be compressed approximately one inch as temperature approaches the operating temperature of 450°. In this manner the expansion and contraction of the bellows is never, in this specific example, more than one inch from the relaxed, unstressed dimension of the bellows. This pre-tensioning coupled with the alignment occasioned by positioning the bellows adjacent the bulkhead and providing the alignment guide 30 assures long life, dependable bellows operation.

The pre-tensioning of the pipes also minimizes the forces applied to the end bulkheads, 14, 16 by the pipes. This may be especially important where the pipe 22 is a relatively cold pipe and the pipe 17 is a relatively hot pipe so that when in use one is under tension and one is expanding applying a compressive force. Under these circumstances, it will be apparent that twisting moments may be applied to the end bulkheads and minimizing these moments by pre-tensioning the bellows means that the total moments of force applied to the bulkheads are always one half the maximum that would be applied were it not for this pre-stressing of the bellows.

Although the invention has been described in its preferred form with a certain degree of particularity, it is understood that the present disclosure of the preferred form has been made only by way of example and that numerous changes in the details of construction and the combination and arrangement of parts may be resorted to without department from the spirit and the scope of the invention as hereinafter claimed.

What is claimed is:

1. The method of assemblying a pre-fabricated conduit having a pipe including an axially aligned bellows, a surrounding casing and means maintaining the pipe and casing in spaced relationship comprising:
    (a) positioning the casing around the pipe;
    (b) applying axial force to the pipe to adjust the pipe to a length approximately average between maximum and minimum lengths anticipated in use; and,
    (c) rigidly connecting a pair of bulkheads to the pipe and to the casing near the respective ends of the casing while the axial force is so applied.

2. The method of claim 1 wherein the casing is positioned around two pipes each including a bellows and wherein axial force is applied to both pipes as the bulkheads are secured to the casing and pipes.

3. The method of claim 1 wherein the casing is substantially filled with granular insulation prior to step (c).

4. The method of assemblying a pre-fabricated conduit having a pipe including an axially aligned bellows, a surrounding casing and means maintaining the pipe and casing in spaced relationship comprising:
    (a) positioning the casing around the pipe;
    (b) tensioning the pipe to a length equal to its normal length when at the average of the maximum and minimum temperatures anticipated in use;
    (c) substantially filling the space between the pipe and insulating with granular insulating material; and,
    (d) sealing the space between the casing and pipe with spaced bulkheads located near the ends of the casing.

5. The method of claim 1 wherein the axial force is applied to tension the bellows.

6. The method of claim 1 wherein the axial force is applied to compress the bellows.

7. A pre-fabricated conduit unit comprising:
    (a) a pipe including an expansion bellows, said bellows being in a stressed condition when at the temperature of the ambient atmosphere;
    (b) a casing;
    (c) spacing means between the support and the casing and maintaining the two in spaced relationship;
    (d) a pair of bulkheads fixed to the casings and pipes and forming imperforate end seals therebetween, said bulkheads also rigidly anchoring the pipes to prevent relative axial movement of the pipe and casing at the bulkheads; and,
    (e) insulation means between the pipe and the casing.

8. A unit of insulated pipe according to claim 7 wherein said bellows is under tension when at the ambient temperature.

9. The unit of claim 7 wherein the insulation means is a granular insulation substantially filling the space between the space between the pipe and the casing.

10. The unit of claim 9 wherein the insulation is Perlite.

11. The unit of claim 7 wherein the spacing means includes alignment guide positioned:
    (a) adjacent the bellows;
    (b) around the pipe;
    (c) within the casing;
    (d) fixed to a selected one of the pipe and casing and in slidable contact with the other; and,
    (e) with the bellows between the guide and one bulkhead.

12. A pre-fabricated conduit unit comprising:
    (a) a pipe member including a relatively long section, a relatively short section, and a bellows securing the sections together in axially aligned relationship, said bellows being in a stressed condition when at the temperature of the ambient atmosphere;
(b) an elongated tubular casing member around the pipe member and in spaced relationship therewith;
(c) supports within the casing member and maintaining the members in spaced relationship;
(d) an alignment guide around the relatively long pipe section adjacent the bellows, the guide being within the casing member, the guide being fixed to one of the members and being in slidable engagement with the other of the members;
(e) a spaced pair of bulkheads each secured to the casing member in fluid tight engagement near one end of the casing, one of the bulkheads being adjacent the bellows, said bulkheads each being fixed to the pipe member to maintain said bellows under stress when at the temperature of the ambient atmosphere and providing imperforate anchoring walls near the ends of the casing member; and,
(f) insulation around the pipe member between the members, and between the bulkheads.

13. The unit of claim 12 wherein there is a second pipe member:
(a) including second relatively long and short sections and a second bellows connecting the sections together in axial alignment;
(b) the second bellows is between the one bulkhead and the guide;
(c) the second pipe sections are respectively secured to the bulkheads in fluid tight anchored relationship; and,
(d) the second relatively long pipe section extends through the guide in slideable relationship.

14. The device of claim 12 wherein solid insulation is around the bellows and between the guide and said one bulkhead and wherein granular insulation substantially fills the space between the guide and the other bulkhead and between the members.

References Cited by the Applicant

UNITED STATES PATENTS

| | | |
|---|---|---|
| 1,218,895 | 3/1917 | Porter. |
| 2,419,278 | 4/1947 | Motsenbocker. |
| 2,930,407 | 3/1960 | Conley et al. |
| 3,146,005 | 8/1964 | Peyton. |

LAVERNE D. GEIGER, *Primary Examiner.*

H. KLINKSIEK, *Assistant Examiner.*